US008442266B2

(12) United States Patent
Berger et al.

(10) Patent No.: US 8,442,266 B2
(45) Date of Patent: May 14, 2013

(54) DEVICE AND METHOD FOR IDENTIFYING MAIL ITEMS

(75) Inventors: Gisbert Berger, Berlin (DE); Georg Kinnemann, Bestensee (DE)

(73) Assignee: Siemens Aktiengesellschaft, Munich (DE)

( * ) Notice: Subject to any disclaimer, the term of this patent is extended or adjusted under 35 U.S.C. 154(b) by 850 days.

(21) Appl. No.: 12/513,435

(22) PCT Filed: Oct. 31, 2007

(86) PCT No.: PCT/EP2007/061781

§ 371 (c)(1), (2), (4) Date: May 4, 2009

(87) PCT Pub. No.: WO2008/053024

PCT Pub. Date: May 8, 2008

(65) Prior Publication Data

US 2010/0111356 A1 May 6, 2010

(30) Foreign Application Priority Data

Nov. 2, 2006 (DE) ........................ 10 2006 051 777

(51) Int. Cl.
*G06K 9/00* (2006.01)
*G06F 17/00* (2006.01)

(52) U.S. Cl.
USPC ............................ 382/101; 382/224; 235/375

(58) Field of Classification Search .................. 382/101, 382/235; 235/375; 705/402
See application file for complete search history.

(56) References Cited

U.S. PATENT DOCUMENTS

| | | | | |
|---|---|---|---|---|
| 6,888,084 | B1 | 5/2005 | Bayer | |
| 7,081,595 | B1 | 7/2006 | Brandt et al. | |
| 2005/0123170 | A1 | 6/2005 | Desprez et al. | |
| 2005/0209977 | A1 * | 9/2005 | Avant et al. | 705/402 |
| 2005/0269395 | A1 | 12/2005 | Miette et al. | |
| 2006/0036556 | A1 * | 2/2006 | Knispel | 705/407 |
| 2006/0113387 | A1 * | 6/2006 | Baker et al. | 235/462.12 |
| 2009/0285486 | A1 | 11/2009 | Berger et al. | |

FOREIGN PATENT DOCUMENTS

| | | | |
|---|---|---|---|
| DE | 4000603 | C2 | 4/1998 |
| DE | 102005040662 | A1 | 3/2007 |
| DE | 102005040689 | A1 | 3/2007 |
| EP | 0844029 | A2 | 5/1998 |
| EP | 1222037 | B1 | 6/2003 |
| EP | 1519796 | B1 | 8/2006 |
| FR | 2841673 | A1 | 1/2004 |
| WO | 2007022876 | A1 | 3/2007 |
| WO | 2007022880 | A1 | 3/2007 |

OTHER PUBLICATIONS

International Search Report dated Feb. 12, 2008.

* cited by examiner

*Primary Examiner* — Amara Abdi

(74) *Attorney, Agent, or Firm* — Laurence A. Greenberg; Werner H. Stemer; Ralph E. Locher

(57) ABSTRACT

A device for identifying mail items includes a memory for storing mail item information of a mail item and characteristic image features of the mail item. A control unit assigns the mail item information to image features that are recorded again. In order that the mail items can still be identified reliably even after a cancellation in print or a forwarding sticker has been applied, the control unit carries out the assignment with the aid of an identification code associated with the mail item.

11 Claims, 2 Drawing Sheets

DEVICE AND METHOD FOR IDENTIFYING MAIL ITEMS

BACKGROUND OF THE INVENTION

Field of the Invention

The invention relates to a device for identifying mail items, comprising a memory for storing mail-item information of a mail item and characteristic image features of the mail item, a means for applying an identification code to the mail item, and comprising a control unit for assigning the mail-item information to image features that are recorded again with the aid of the identification code. The invention also relates to a method for identifying mail items, in which characteristic image features of a mail item are recorded and, through comparison with stored characteristic image features of a plurality of mail items, are assigned to a mail-item information of the mail item, this assignment being effected with the aid of an identification code applied to the mail item.

In mail-sorting facilities for letters, parcels, documents, or other items, information about the items to be sorted is collected and assigned to the items so that the items can be sorted on the basis of this information. The obtaining of such information can be associated with a considerable outlay. For example, in mail-sorting facilities it is known for mail items to be conveyed past a camera and for an address on the mail item to be recognized with the aid of one or more recordings of the mail item so that the mail item can be sorted according to the address. Here, machine reading of the address requires a high-resolution camera and complex data processing, which can be associated with a costly maintenance of databases, for example directories of zip codes or addresses. If an address is not machine-readable, then it is known for it to be recognized with the aid of a video-coding method involving high personnel costs.

In order not to have to re-acquire the information thus acquired in a subsequent sorting pass, it is known, for example from DE 40 00 603 C2, for a barcode to be imprinted on to the mail item by means of a code printer from a sufficiently large range of values such that the mail item can at any time and at any point in the mail-sorting facility automatically be recognized and linked to the address stored in a memory and correspondingly sorted.

In order to save on the need for a high-speed printer and consumable materials for such encoding, development is moving toward the recognition of mail items through image processing. In this respect, it is known for mail items being sorted to be respectively assigned a so-called signature which comprises characteristic image features of the mail item such as, for example, the position, size and color of imprints, orientations of such image features relative to one another, and so on. To this end, mail-item information such as address, franking and the like, are filed together with the signature in a memory. In a later identification pass, the characteristic image features of the mail item are re-recorded and compared with the filed signatures. Where there is an adequate match between the image features and the filed signature, the mail item can be assigned to the mail-item information linked to the signature in the memory. In this way, the mail item can be identified from a quantity of mail items recorded earlier and the mail-item information assigned to it does not have to be re-acquired.

From US 2005/0269295 A1, a mail-sorting facility is known in which the mail items are identified on the basis of a barcode imprinted on them and, in addition, the signature of the mail items is recorded. If during an identification a barcode is not fully legible, then the signature is used as an aid in order to be able to identify the mail items alternatively on the basis of the signature.

EP 0 844 029 B1 specifies means enabling the size of the barcode on the mail items to be reduced, whereby the size of the mail item is used as an additional feature to the barcode for identification.

BRIEF SUMMARY OF THE INVENTION

The object of the invention is to specify a device and a method for identifying mail items, by means of which the mail items can be identified reliably.

The object directed toward the device is achieved in a device of the type specified in the introduction, in which the control unit is provided according to the invention for selecting the identification code to be applied as a function of a distinctiveness of the image features. In addition to a comparison of the characteristic image features recorded in a later identification pass with characteristic image features recorded earlier, the newly recorded identification code can be compared with a stored identification code. A very reliable identification, i.e. an assignment of the mail item to be identified to a stored data record relating to this mail item, can be achieved by this means.

Through selection of the identification code to be applied as a function of a distinctiveness of the image features, an intelligent allocation of the identification code can be achieved in a simple manner. The distinctiveness is for example a distinctiveness between mail items, as described below, or between signatures. Thus, for example, a small range of values with frequent repetition of the identification code can be assigned to distinctive signatures, and those identification codes which are seldom allocated can be assigned to less distinctive signatures. A distinctiveness between signatures can be a vectorial distance between the signatures represented by feature vectors.

The invention starts here from the assumption that an identification based solely or predominantly upon the signature, i.e. the characteristic features of the mail item, is rendered more difficult by imprints or stickers, such as a cancellation mark or a forwarding sticker, applied to the mail item in the interim. These additional marks are not contained in the stored signature, but are an integral part of the image features recorded in the later identification pass, so that these image features may possibly deviate considerably from the earlier signature. In such cases, the recognition rate or identification rate for the mail items may turn out to be significantly lower and an error rate significantly higher. By means of the identification code, which is stored assigned to the signature and can be read during the later identification pass error-free and unaffected by additional marks, the recognition rate can be increased considerably and the error rate kept low.

The mail items can be postal items such as letters, parcels and small packages or large letters such as catalogues and the like. Mail items can also be flat items which are to be sorted—i.e. to be sent e.g. to a destination container—such as documents or forms, for example. The characteristic image features can be data which is obtained from brightness patterns or color patterns of the mail item, from geometric parameters of imprints such as length or shape or reciprocal arrangement or such like and with which the mail item can be characterized. This data can be obtained from a recorded image according to predefined parameters. The mail-item information can be an address of the mail item and indicate a mailing destination or sorting destination. Weight, franking, rigidity or other parameters of the mail item are also possible. The identification code is a mark applied to the surface of the mail item for the purpose of distinguishing it and may be imprinted, affixed or otherwise attached. The identification code can be a printed mark in the form of a matrix, a dot array, numerals or a barcode. A printed sticker, a magnetic element or an RFID (radio frequency identifier) would also be possible. The connection of the identification code with the mail item is of a physical nature and can be designed such that it can be scanned from the mail item, for example optically, mechanically, magnetically or by means of radiation.

In an advantageous embodiment of the invention, the identification code is so approximate that its variation possibilities are lower than variation possibilities of the mail-item information. The identification code is not intended here as a substitute for the signature or a known barcode for uniquely identifying the mail item, but as a supplement so that its variation possibilities, i.e. the size of a range of values from which the identification code can be picked, is small in relation, for example, to all possible addresses or zip codes or other sort criteria. The identification code is in this way easily printable and/or easily readable. It can also be compact such that it does not substantially affect an appearance of the mail item. It is usefully embodied such that alone it is not sufficient to identify the mail item.

It is also advantageous if the device is provided not only for reading the identification code but also for applying the identification code. For this, the device usefully comprises a means for applying the identification code to the mail item. The means can be a printer or a means for affixing an item.

The need for an additional print device can be spared if the means for applying a shipping mark to the mail item is provided. Such a shipping mark can be a cancellation imprint or an imprint on a sticker, for example a forwarding sticker. The identification code and the shipping mark are usefully applied with the same print head. Thus, when a stamp is cancelled or when the sticker is printed, an identification code can be printed next to the stamp or on to the sticker, which identification code then supports the signature system in the recognition process. In particular, the control unit is provided for controlling the application of the identification code and of the shipping mark in a print process by the means.

The control unit may comprise one or more computational units, for example one for controlling the application of the identification code and another for assigning the mail-item information to the signature with the aid of the identification code.

The invention can also advantageously be developed further whereby the control unit is provided for controlling application of an identification code onto all the singularized mail items of a mail stream. In this way, a mail item without an identification code can be recorded beyond doubt as a double feed, thereby sparing the need to search for its signature in the memory.

When the re-recorded image features are assigned to the stored mail-item information, the re-recorded image features are compared with stored image features or signatures. Here, re-recorded features are compared with stored features, for example according to a predetermined model. For reliable identification, the identification code can be used as an additional feature to be compared. To this end, the control unit is usefully provided for using the identification code in the assignment process as an additional feature to the characteristic image features.

As described above, the identification code usefully manages with a relatively small range of values, so that the same identification code could be allocated several times in the course of a sorting procedure. In order to guarantee reliable identification, it is therefore advantageous to allocate the identification code not randomly but intelligently. The control unit is therefore advantageously provided for selecting the identification code as a function of a parameter of the image features. Thus, for example, an identical identification code is allocated to two mail items which are otherwise as different as possible.

For example, the control unit can be provided for selecting the identification code as a function of a similarity of the parameters of the image features of a plurality of mail items. In this way, mail items which have a similar signature can receive different identification codes and consequently be easily distinguished. Prior to multiple allocation of an identical identification code, the control unit can determine how different the signature of the mail items with the same identification code is and allocate the same identification code again only when the difference exceeds a specified value, for example a probability value. If the difference is smaller, a new identification code is taken and the comparison procedure restarted until an identification code for exclusively differing mail items is found.

The identification code is advantageously small and inconspicuous in the appearance of the mail item. In order, therefore, to manage with a printer of as low a resolution as possible, an approximate identification code is usefully chosen which—with a limited size—has only a small range of values. A small range of values may possibly not suffice for reliably distinguishing mail items where a large number of very similar bulk mail items is to be sorted. This disadvantage can be countered if the control unit is provided for selecting a data range of the identification code as a function of a parameter of the image features. If, for example, the image features of a large number of mail items are the same or similar, the control unit can control the allocation of larger identification codes which, though more conspicuous in appearance, constitute a larger range of values.

A further option for allocating the identification code intelligently is for the control unit to be provided for selecting the identification code as a function of the mail-item information. Thus, mail items with a similar address or sort destination, e.g. sorting container, can be assigned a different identification code so that mail items which after the sorting process are located together e.g. in a container, carry different identification codes. In this way, mail items from one container can reliably be distinguished in a next more refined sorting pass. If in this sorting pass the container number is added to the signature as an additional feature, then all the mail items from a plurality of containers can also reliably be distinguished.

The object directed toward the method is achieved in a method of the type specified in the introduction, in which according to the invention the assignment of image features to a mail item information of the mail item is effected with the aid of an identification code associated with the mail item. In addition to comparing the characteristic image features, the recorded identification code can be compared with a stored identification code and a very reliable identification can be achieved.

The invention will be explained in detail below on the basis of exemplary embodiments which are represented in the drawings, in which:

DESCRIPTION OF THE INVENTION

Figure 1:
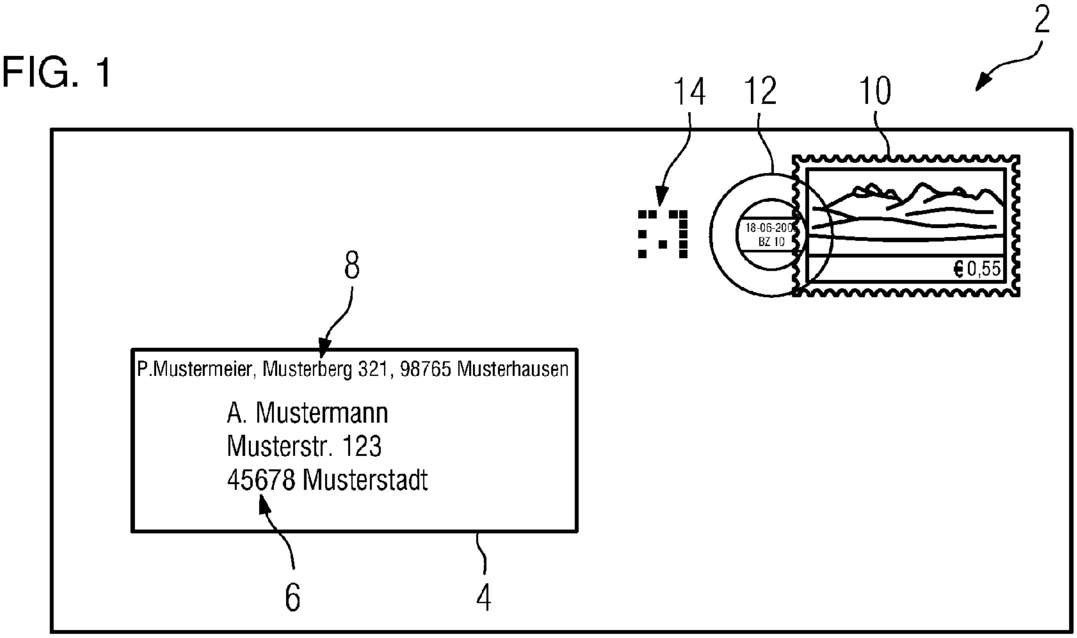
FIG. 1 shows a mail item with an identification code next to a cancellation mark.

FIG. 1 shows a mail item 2 in the form of a letter with a window envelope, through the window 4 of which an address 6 and a return address 8 are visible. Affixed to the window envelope is a stamp 10 which is cancelled by a cancellation imprint 12. Applied next to the cancellation imprint 12 is an identification code 14 consisting of an array of 5×5 square dots, of which some are printed and others omitted.

Figure 2:
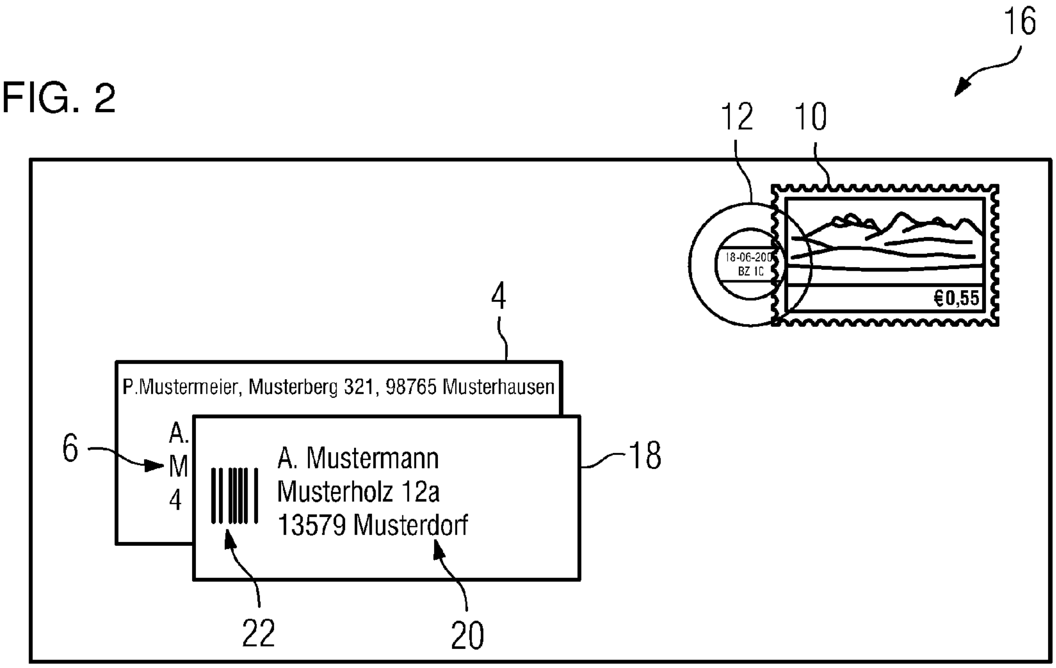
FIG. 2 shows another mail item with an identification code on a forwarding sticker.

FIG. 2 shows a further mail item 16, which is identical to the mail item 2 apart from a forwarding sticker 18, on which are imprinted a forwarding address 20 and an identification code 22 in the form of a barcode which replaces the identification code 14.

Both the identification code 14 and the identification code 22 are very compact in terms of design and comprise only relatively few individual elements so that the range of values of all possible identification codes 14, 22 is so small that it is not sufficient to identify uniquely the mail items 2, 16. For example, the address 6 cannot be expressed in the form of the identification codes 14, 22. In addition, the two identification codes 14, 22 are of very approximate design so that they can readily be imprinted by a printer together with the cancellation imprint 12 and/or the forwarding address 20.

Figure 3:
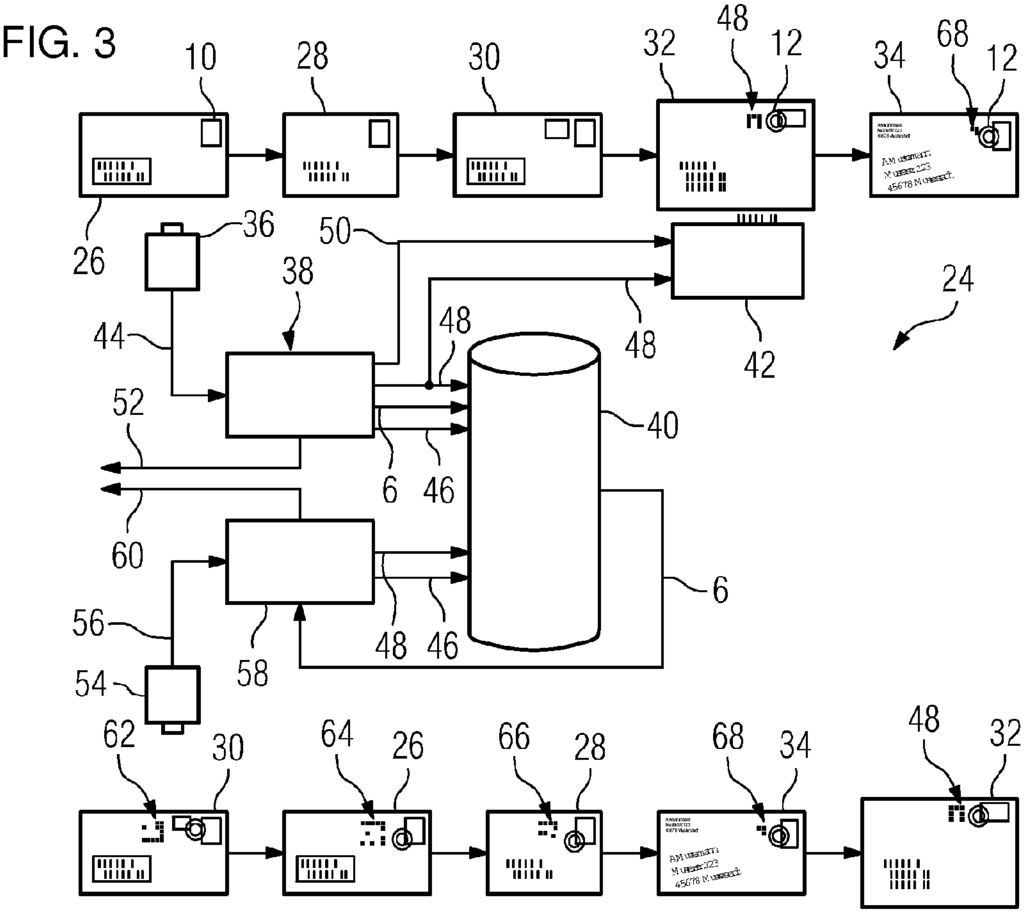
FIG. 3 shows a device for identifying mail items.

FIG. 3 shows a device 24 for identifying mail items 26, 28, 30, 32, 34, comprising a camera 36, a control unit 38, a memory 40 and a means 42 embodied as a high-speed printer for applying identification codes 48, 62, 64, 66, 68 to the mail items 26-34.

In a registration pass for the mail items 26-34 by a mail-item sorting facility, of which the device 24 is a part, the mail items 26-34 are conveyed past the camera 36 and optically scanned by said camera. The camera 36 sends the data 44 obtained from the scanning to the control unit 38, which from a resulting image records characteristic image features of each and every mail item 26-34, such as the size and position of the window 4, the address 6 and return address 8 and the color and shape of the stamp 10, as well as the relative position of these elements to one another. From these characteristic image features of the mail item 26-34, a feature vector 46, also called a signature, which is characteristic for the respective mail item 26-34 is obtained for each mail item 26-34 by the control unit 38 by means of suitable image processing. The control unit 38 also determines the addresses 6 of the individual mail items 26-34 which are obtained from the image processing. In addition, the control unit 38 determines the type of stamp 10 and further data, such as the weight, rigidity and dimensions of the mail items 26-34, are supplied to it. The address 6 and this data is transmitted with the feature vector 46 from the control unit 38 to the memory 40, which is embodied in the form of a database.

Furthermore, the control unit 38 determines for each of the mail items 26-34 an identification code 48, 62-68 which it sends both to the memory 40 and to the means 42 for applying the identification code 48, 62-68, to which means the control unit 38 also sends a cancellation command 50. The mail items 26-34 are now conveyed past the means 42 which with its print head applies in one print process both the cancellation imprint 12 and the identification code 48, 62-68 to each mail item 26-34. In this way, an additional printer can be dispensed with. Finally, the mail items 26-34 are pre-sorted in response to a sort command 52 of the control unit 38.

In a subsequent pass, the mail items 26-34 which have, for example, already been pre-sorted, are arranged in a different order and mixed e.g. with further mail items. In order to enable further sorting without re-determining the address 6 and all the data 44, the mail items 26-34 have to be re-identified, i.e. re-assigned to the data and addresses 6 filed in the memory 40. To this end, they are conveyed in an identification pass in a different part of the device 24 or in a different device or in the same part of the device 24 past a different camera 54 or again past the same camera 36. In FIG. 3, it is a different camera 54 in a different part of the device 24. The data 56 formed by the camera 54 is fed to a further computational unit 58 of the control unit 38 and processed there. The computational unit 58 can also be a separate control unit.

The control unit 38 determines from the data 56 the feature vector 46 and the identification code 48, 62-68 and compares the two with the data filed in the memory 40. Here, the identification code 48, 62-68 is treated by the control unit 38 as a further feature of the feature vector 46. By means of this additional feature, the address 6 and the further data can reliably be assigned to the respective mail item 26-34, even if the letter paper in the window envelope and consequently the address 6 in the window 4 has shifted position and as a result the features differ somewhat from the originally recorded features and despite the additional cancellation imprint 12. It is also possible for the identification to be carried out by means of a routine in the database which then outputs the address and can be viewed as part of the control unit 38. From the address 6 and, where applicable, the further data, the control unit 38 determines what further action to take and outputs e.g. a new sort command 60.

The control unit 38 is programmed such that in the registration pass an identification code 48, 62-28 is applied in each case to all the singularized mail items 26-34. In this way, a mail item which has been double-fed and of which no image has been recorded by the camera 36 is recognized as such immediately as its identification code is missing or has been applied only incompletely, for example if an identification code is applied to two mail items which are stuck to one another and are overlapping.

The identification codes 48, 62-68 for the mail items 26-34 are allocated intelligently by the control unit 38. Thus, the mail item 30 receives an identification code 62 as a matrix comprising 4×4 printed or unprinted dots. This mail item 30 has two stamps and by virtue of this alone has a relatively distinctive signature. The mail item 26 by contrast has an indistinctive signature of a bulk mail item. It is assigned a spatially larger identification code 64 comprising 5×5 dots, so that a large number of such letters can reliably be distinguished from one another. The mail item 28 is somewhat shorter than usual and makes do with an identification code 64 comprising a 4×4 matrix. The mail item 34 is very striking and has a very distinctive signature, so this mail item 34 is assigned only a very small and inconspicuous identification code 68 comprising 2×2 dots. Precisely the same identification code 68 is to be found quite frequently in the mail stream of mail items 26-34 and further mail items in the device 24, but the highly distinctive nature of the feature vector 46 of the mail item 34 essentially means that no identification code 68 is needed at all. It is therefore also possible to dispense with an identification code completely in the case of some mail items and to equip only mail items which are difficult to distinguish with an identification code. The mail item 32 has on account of its unusual format only a simple identification code 48 consisting of a matrix comprising 3×3 dots.

Figure 4:
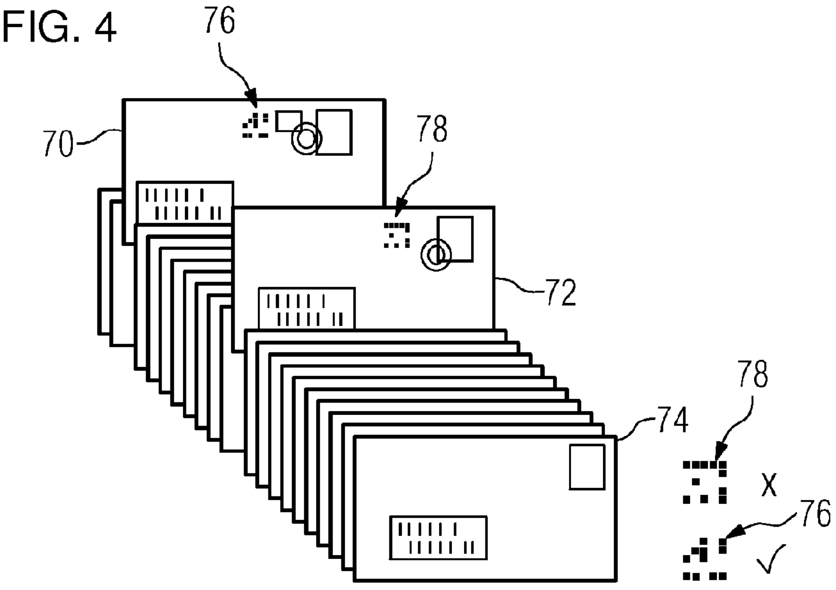
FIG. 4 shows a batch of bulk mail items with identification codes.

FIG. 4 shows a batch of very similar bulk mail items which passes the camera 36 in singularized form and runs through the mail-item sorting facility as a mail stream. Each of the mail items 70, 72, 74 is given an identification code 76, 78. Ultimately, the mail item 74 is also to be furnished with an identification code, but all the available codes from the available range of values have already been allocated. The control unit 38 allocates a code to the mail item 74 in an intelligent manner. To do this, it searches for an identification code 78 which has already been allocated and, in addition, searches for all the feature vectors 46 of those mail items 72 which carry precisely this identification code 78. If, as it does so, a mail item 72 is found which has a feature vector 46 which is very similar to the feature vector 46 of the mail item 74 to be labeled, the allocation of this identification code could lead to mix-ups. The identification code 78 is therefore rejected and a new identification code 76 is sought. In turn, the feature vectors 46 of all the mail items 70 which carry this identification code 76 are compared with the feature vector 46 of the mail item 74. If there turns out to be no great similarity, the identification code 76 is allocated afresh, this time to the mail item 74. If no suitable identification code 76, 78 is found, then a critical identification code 78 is allocated and all the data records of the corresponding mail items 72, 74 are furnished with a warning marker. The result of this is that during a later identification process high recognition values are required for the mail items 72, 74.

The invention claimed is:

1. A device for identifying mail items, comprising:

a memory for storing mail-item information of a mail item and characteristic image features of the mail item, the characteristic image features being data obtained from brightness patterns or color patterns of the mail item, from geometric parameters of imprints such as length or shape or reciprocal arrangement or such like with which the mail item can be characterized;

means for applying an identification code to the mail item; and a control unit configured for:

storing characteristic image features and mail-item information of mail items of a plurality of mail items recorded in an earlier identification pass;

selecting identification codes for the mail items including selecting the identification code of a mail item based on a discrimination ability of the characteristic image features of the mail item, storing the identification codes assigned to the characteristic image features of the mail items and applying the identification codes to the mail items;

comparing characteristic image features of one of the mail items recorded in a later identification pass with the stored characteristic image features with additionally comparing an identification code of the mail item recorded in the later identification pass with the stored identification codes identifying the mail item; and associating a stored mail-item information relating to the mail item identified by the comparing and the additional comparing.

2. The device according to claim 1, wherein the identification code is so coarse that variation possibilities of the identification code are lower than variation possibilities of the mail-item information.

3. The device according to claim 2, wherein said means for applying an identification code are configured to apply a shipping mark to the mail item.

4. The device according to claim 3, wherein said control unit is configured to control an application of the identification code and of a shipping mark in a print process by said means.

5. The device according to claim 1, wherein said control unit is configured to control an application of an identification code to each singularized mail item of a stream of mail items.

6. The device according to claim 1, wherein said control unit is configured to utilize the identification code in the assignment process as an additional feature to the characteristic image features.

7. The device according to claim 1, wherein said control unit is configured to select the identification code in dependence on a similarity of parameters of the image features of a plurality of mail items.

8. The device according to claim 7, wherein said control unit is configured to select a data range of the identification code as a function of a parameter of the image features.

9. The device according to claim 1, wherein said control unit is configured to select a data range of the identification code as a function of a parameter of the image features.

10. The device according to claim 1, wherein said control unit is configured to select the identification code in dependence on the mail-item information.

11. A method for identifying mail items, which comprises:

storing characteristic image features and mail-item information of mail items of a plurality of mail items recorded in an earlier identification pass, the characteristic image features being data obtained from brightness patterns or color patterns of the mail item, from geometric parameters of imprints such as length or shape or reciprocal arrangement or such like with which the mail item can be characterized;

selecting identification codes for the mail items including selecting the identification code of a mail item based on a discrimination ability of the characteristic image features of the mail item, storing the identification codes assigned to the characteristic image features of the mail items and applying the identification codes to the mail items;

comparing characteristic image features of one of the mail items recorded in a later identification pass with the stored characteristic image features with additionally comparing an identification code of the mail item recorded in the later identification pass with the stored identification codes identifying the mail item; and associating a stored mail-item information relating to the mail item identified by the comparing and the additional comparing.

* * * * *